US012145539B2

(12) United States Patent
Peterson

(10) Patent No.: US 12,145,539 B2
(45) Date of Patent: Nov. 19, 2024

(54) STEPS FOR UTILITY VANS

(71) Applicant: National Fleet Products, Inc., Buffalo, MN (US)

(72) Inventor: Steven Peterson, Wayzata, MN (US)

(73) Assignee: National Fleet Products, Inc., Buffalo, MN (US)

( * ) Notice: Subject to any disclaimer, the term of this patent is extended or adjusted under 35 U.S.C. 154(b) by 165 days.

(21) Appl. No.: 17/742,210

(22) Filed: May 11, 2022

(65) Prior Publication Data
US 2022/0363197 A1  Nov. 17, 2022

Related U.S. Application Data

(60) Provisional application No. 63/187,370, filed on May 11, 2021.

(51) Int. Cl.
*B60R 3/00* (2006.01)

(52) U.S. Cl.
CPC .................. *B60R 3/007* (2013.01)

(58) Field of Classification Search
CPC .................. B60R 3/007; B60R 3/02
See application file for complete search history.

(56) References Cited

U.S. PATENT DOCUMENTS

| | | | | |
|---|---|---|---|---|
| 3,330,577 A * | 7/1967 | Mills | ........................ | B60R 3/02 280/166 |
| 3,392,990 A * | 7/1968 | Wolf | ........................ | B60R 3/02 280/166 |
| 3,407,901 A * | 10/1968 | Brammer | ................ | B60R 3/007 182/206 |
| 3,858,905 A * | 1/1975 | Peebles | .................... | B60R 3/007 280/166 |
| 4,264,084 A * | 4/1981 | Telles | ........................ | B60R 3/02 182/115 |
| 4,347,638 A * | 9/1982 | Weaver | ...................... | B60R 3/02 182/115 |
| 5,228,707 A * | 7/1993 | Yoder | ....................... | B60R 3/02 182/127 |
| 5,653,459 A * | 8/1997 | Murphy | .................. | B60R 3/007 280/166 |
| 5,803,475 A * | 9/1998 | Dick | ....................... | B60R 3/007 280/166 |
| 5,876,051 A * | 3/1999 | Sage, Sr. | .................. | B60R 3/007 296/156 |
| 6,942,271 B1 * | 9/2005 | Jamison | .................. | B60R 3/007 296/61 |
| 7,055,838 B2 * | 6/2006 | Lambie | ................... | B60R 3/007 182/127 |
| 7,111,858 B2 * | 9/2006 | Manser | ..................... | B60R 3/02 182/127 |

(Continued)

*Primary Examiner* — Jeffrey J Restifo
(74) *Attorney, Agent, or Firm* — Skaar Ulbrich Macari, P.A.

(57) ABSTRACT

A stair assembly for utility vans can include a top step and a lower step, each spanning horizontally between a pair of side rails. A mounting flange is disposed atop each side rail. An aperture is defined through the mounting flanges to allow for a pin to be employed to pivotally mount the stair assembly to a mounting plate in a van. When deployed, a portion of the bottom surface of the top step rests atop the top surface of the bumper of the van. The stair assembly can be folded upward into the van such that the door of the van can be closed without removing the stair assembly.

18 Claims, 13 Drawing Sheets

(56) References Cited

U.S. PATENT DOCUMENTS

| | | | | |
|---|---|---|---|---|
| 7,240,947 B2* | 7/2007 | Kuznarik | ............ | B62D 33/0273 |
| | | | | 296/62 |
| 7,766,357 B2* | 8/2010 | Arvanites | ............... | B60R 3/007 |
| | | | | 182/127 |
| 8,678,411 B2* | 3/2014 | Kibler | ...................... | B60R 3/02 |
| | | | | 182/127 |
| 9,022,405 B2* | 5/2015 | Kibler | ...................... | B60R 3/02 |
| | | | | 182/127 |
| 9,308,869 B1* | 4/2016 | Owens, Jr. | ................ | E04G 1/28 |
| 9,487,147 B1* | 11/2016 | Morrill | .................... | B60D 1/58 |
| 9,821,716 B1* | 11/2017 | Hernandez | ............. | B60R 3/007 |
| 10,449,904 B2* | 10/2019 | Feinberg | ................. | B60R 3/007 |
| 11,292,391 B2* | 4/2022 | Kay | ......................... | B60R 3/007 |
| 11,584,302 B2* | 2/2023 | Jackson | .................... | B60R 3/02 |
| 2010/0012431 A1* | 1/2010 | Ehnes | ....................... | E06C 5/20 |
| | | | | 182/150 |
| 2010/0019468 A1* | 1/2010 | Price | ....................... | B60R 3/007 |
| | | | | 280/165 |
| 2010/0025954 A1* | 2/2010 | Gottlinger | ................ | B60R 3/02 |
| | | | | 280/166 |
| 2010/0025955 A1* | 2/2010 | Carr, Jr. | .................... | B60R 3/02 |
| | | | | 280/166 |
| 2010/0096215 A1* | 4/2010 | McFarlane | .............. | E06C 7/182 |
| | | | | 182/127 |
| 2010/0122871 A1* | 5/2010 | Gottlinger | ................. | E06C 5/02 |
| | | | | 182/106 |
| 2013/0193667 A1* | 8/2013 | Ellement | ............... | E02F 9/0833 |
| | | | | 280/166 |
| 2019/0351832 A1* | 11/2019 | Fuller | ....................... | E06C 5/36 |
| 2022/0134957 A1* | 5/2022 | Kapur | ....................... | B60R 3/02 |
| | | | | 280/164.1 |
| 2022/0363197 A1* | 11/2022 | Peterson | ................. | B60R 3/007 |
| 2023/0079517 A1* | 3/2023 | Demonte | .................. | B60R 3/02 |
| | | | | 187/250 |
| 2023/0114575 A1* | 4/2023 | Kapur | ....................... | B60R 3/02 |
| | | | | 280/163 |
| 2023/0132547 A1* | 5/2023 | Niemela | .................. | B60R 9/08 |
| | | | | 280/727 |
| 2023/0182642 A1* | 6/2023 | Nine | ....................... | B60R 3/007 |
| | | | | 280/166 |
| 2023/0294607 A1* | 9/2023 | Mason | .................... | B60R 3/007 |
| | | | | 52/182 |

* cited by examiner

STEPS FOR UTILITY VANS

PRIORITY

This application claims priority under 35 U.S.C. § 119(e) to, and hereby incorporates by reference in its entirety, U.S. Provisional Application No. 63/187,370, filed May 11, 2021.

FIELD

The present invention relates to vehicle accessories, and more particularly, to a folding stair system for utility vans.

BACKGROUND

It is increasingly popular to employ utility vans, such as the FORD TRANSIT, RAM PROMASTER, MERCEDES BENZ SPRINTER and others, for cargo, utility, passenger and recreational vehicle purposes. However, it is inconvenient and sometimes difficult for persons to enter and exit these types of vans due to their relatively high step-in/out height.

It is known to mount steps or running boards to the exteriors of these utility vans. However, such steps or running boards are permanently mounted. As such, they can reduce ground clearance, accumulate mud and snow, are prone to rusting and can be damaged or ripped off of the van. Employing a powered retraction feature is expensive and prone to failure.

Therefore, there is a continuing need to provide an improved, easy-to-use and remove stair system for utility vans.

SUMMARY

Provided is a stair assembly for utility vans and method of operating the same. The stair assembly can include a top step and a lower step, each spanning horizontally between a pair of side rails. A mounting flange is disposed atop each side rail. An aperture is defined through the mounting flanges to allow for a pin to be employed to pivotally mount the stair assembly to a mounting plate in a van. When deployed, a portion of the bottom surface of the top step rests atop the top surface of the bumper of the van. The stair assembly can be folded upward into the van such that the door of the van can be closed without removing the stair assembly.

A stair assembly for a utility van can comprise in one example embodiment a pair of side rails oriented parallel to one another, a first step, a second step and a pair of mounting flanges. Each side rail has a first longitudinal end and a second longitudinal end. The first step spans between the pair of side rails. The second step spans between the pair of side rails, and is arranged between the first step and the second longitudinal ends of the pair of side rails. A mounting flange extends from the first longitudinal end of each respective one of the pair of side rails. Each mounting flange defines an aperture through the flange in a direction perpendicular to a longitudinal axis of the pair of side rails.

The first step is located relative to the first end of the pair of side rails such that a bottom of the first step can rest atop a bumper surface of the utility van when the stair assembly is in a deployed state.

The mounting plate can include a flat base portion and a support flange. The support flange can extend perpendicular from the flat base portion at a longitudinal end of the flat base portion.

The mounting plate can include a pair of hinge tabs. Each hinge tab can be configured to receive a portion of a respective one of the support flanges such that the aperture in each of the mounting flanges aligns axially with each respective hinge tab. Each of the hinge tabs can be removably fastened to the flat base portion.

A pair of pins can be provided. Each pin is insertable through a respective one of the hinge tabs and apertures of the support flanges such that the pair of side rails are constrained to rotatably pivot about a longitudinal axis of the pins.

Each mounting flange can define a pivot stop surface along an edge thereof.

Each of the first and second steps can include a textured upper surface. The textured upper surface can comprise a metal lattice.

Each of the mounting flanges is fastened to a respective one of the pair of side rails. The mounting flanges can be removably fastened via bolts.

The mounting plate can be configured such that the pair of mounting flanges can be pivotably secured to the mounting plate without blocking normal closing of any doors of the utility van.

A reinforcement member can be provided to at least one of the first and second steps.

A method of providing stairs to a utility van is also disclosed. In one example embodiment, the method includes fastening a mounting plate to the utility van adjacent to a door thereof, pivotably coupling a stair assembly to the mounting plate, pivoting the stair assembly into a deployed position where a bottom of the uppermost step rests atop a bumper of the utility van, pivoting the stair assembly into a retracted position, and closing the door of the utility van adjacent to the stair assembly fully while the stair assembly is in the retracted position without uncoupling the stair assembly from the mounting plate.

The step of pivotably coupling a stair assembly to the mounting plate can comprise pinning a mounting flange of the stair assembly to the mounting plate.

The step of pivotably coupling a stair assembly to the mounting plate can comprise pinning a mounting flange of the stair assembly to a hinge plate provided to the mounting plate.

The step of fastening a mounting plate to the utility van adjacent to a door thereof can comprise fastening a flat base portion of the mounting plate to a horizontal surface of the utility van and fastening a support flange extending perpendicular from the flat base portion at a longitudinal end of the flat base portion to a vertical surface of the utility van.

The mounting flange can be removably fastened to a first end of each of a pair of side rails of the stair assembly.

A stair system for utility vans, according to a disclosed example can include a stair assembly and a mounting plate. The stair assembly can include a pair of side rails oriented parallel to one another, each side rail having a first longitudinal end and a second longitudinal end; a first step spanning between the pair of side rails; a second step spanning between the pair of side rails, the second step arranged between the first step and the second longitudinal ends of the pair of side rails; a pair of mounting flanges, wherein one of the mounting flanges extends from the first longitudinal end of each one of the pair of side rails; and a mounting plate, the mounting plate including a flat base portion and a support flange, the support flange extending perpendicular from the flat base portion at a longitudinal end of the flat base portion.

Each of the mounting flanges can be pivotally coupled to the flat base portion of the mounting plate such that the stair assembly can rotatably pivot between a deployed state and a retracted state.

The first step can be located relative to the first end of the pair of side rails such that a bottom of the first step can rest atop a bumper surface of the utility van when the stair assembly is in the deployed state.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims.

The various features or aspects discussed herein can also be combined in additional combinations and embodiments, whether or not explicitly discussed herein, without departing from the scope of the invention.

Figure 1:
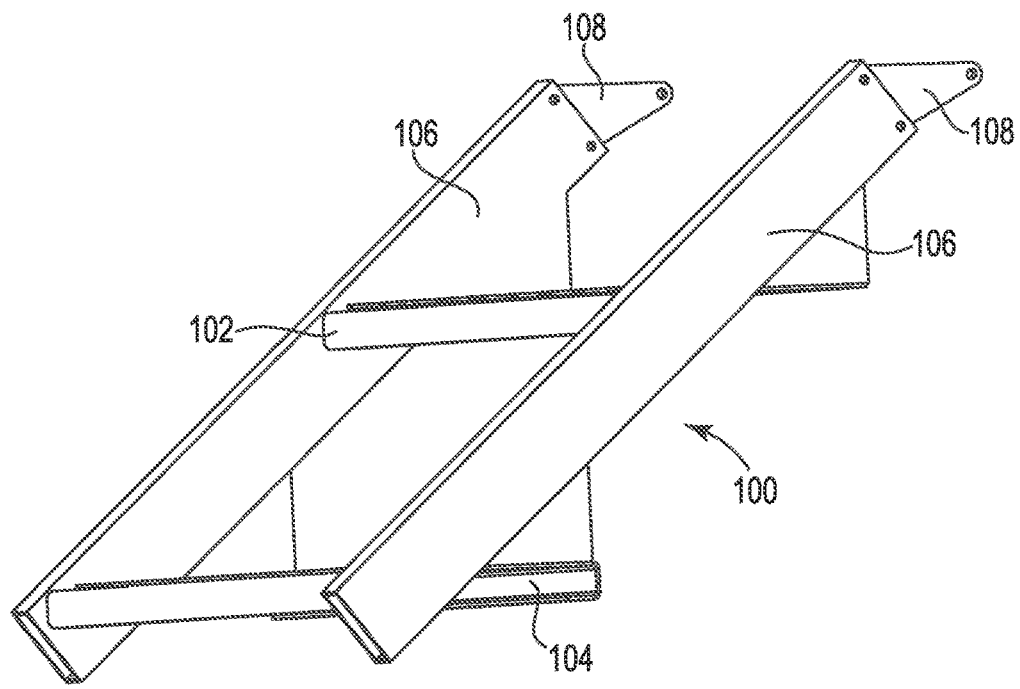
FIG. 1 is a perspective view of a van step assembly in accordance with certain aspects of the invention.
Figure 2:
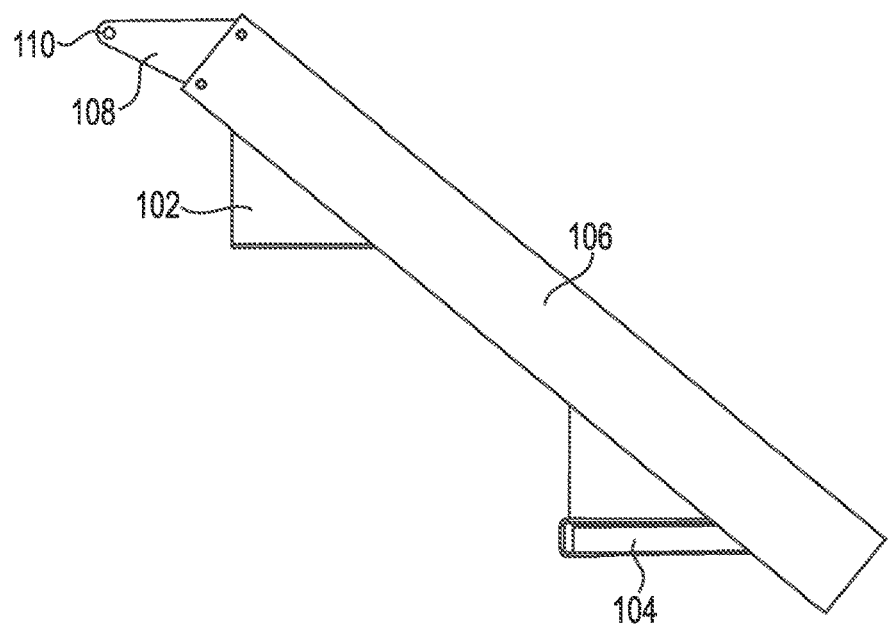
FIG. 2 is a side view of a van step assembly in accordance with certain aspects of the invention.
Figure 3:
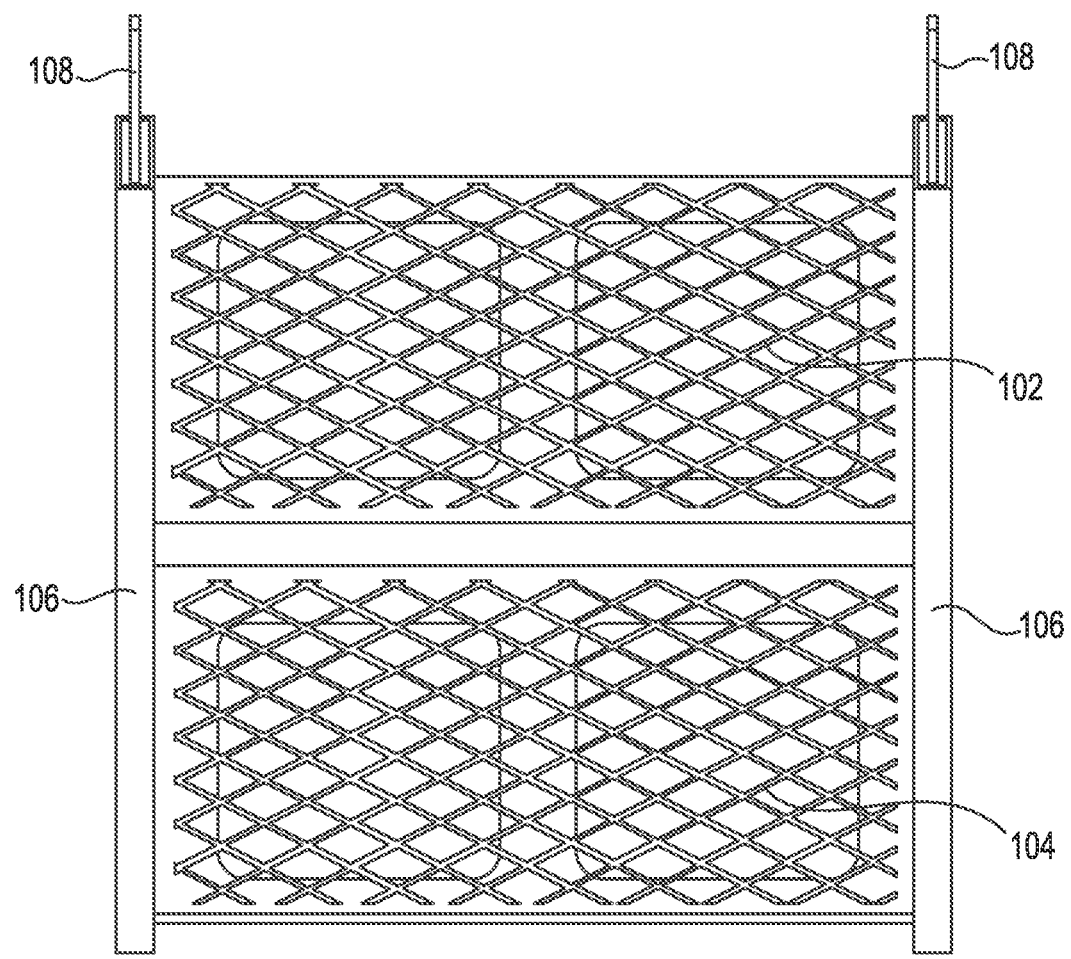
FIG. 3 is a top view of a van step assembly in accordance with certain aspects of the invention.
Figure 4:
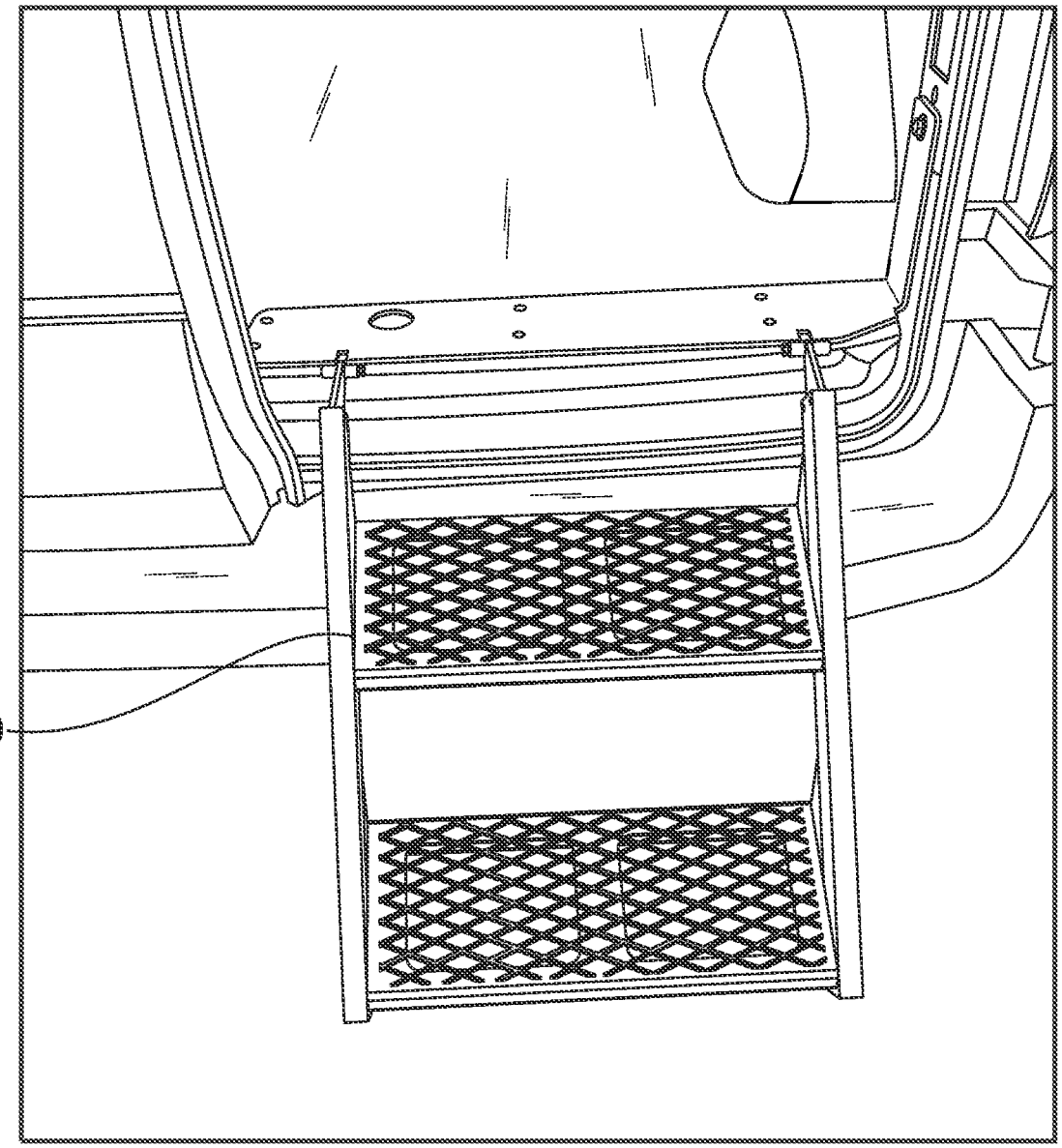
FIG. 4 is a perspective view of a van step assembly installed on a utility van in accordance with certain aspects of the invention.
Figure 5:
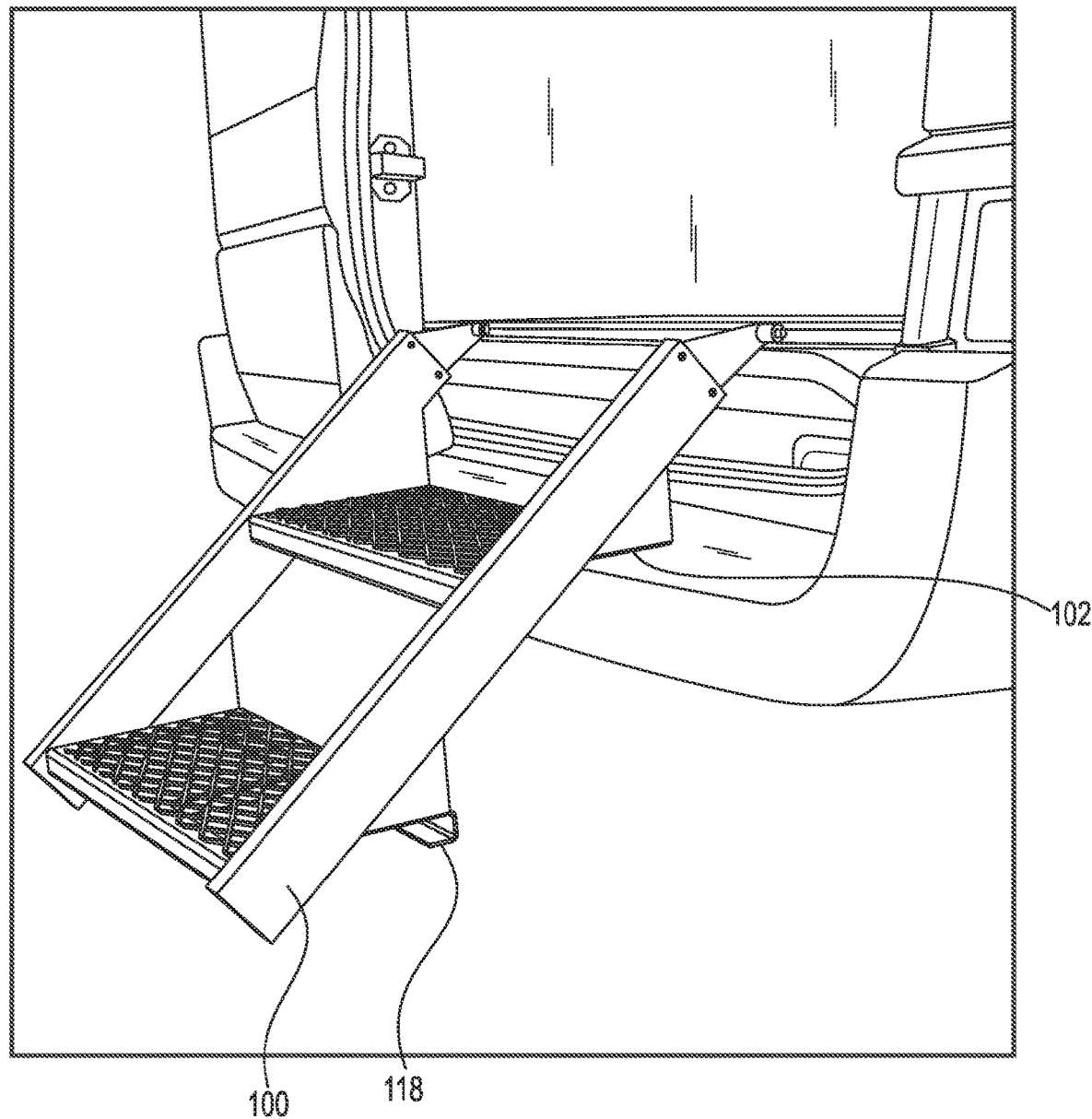
FIG. 5 is a perspective view of a van step assembly installed on a utility van in accordance with certain aspects of the invention.
Figure 6:
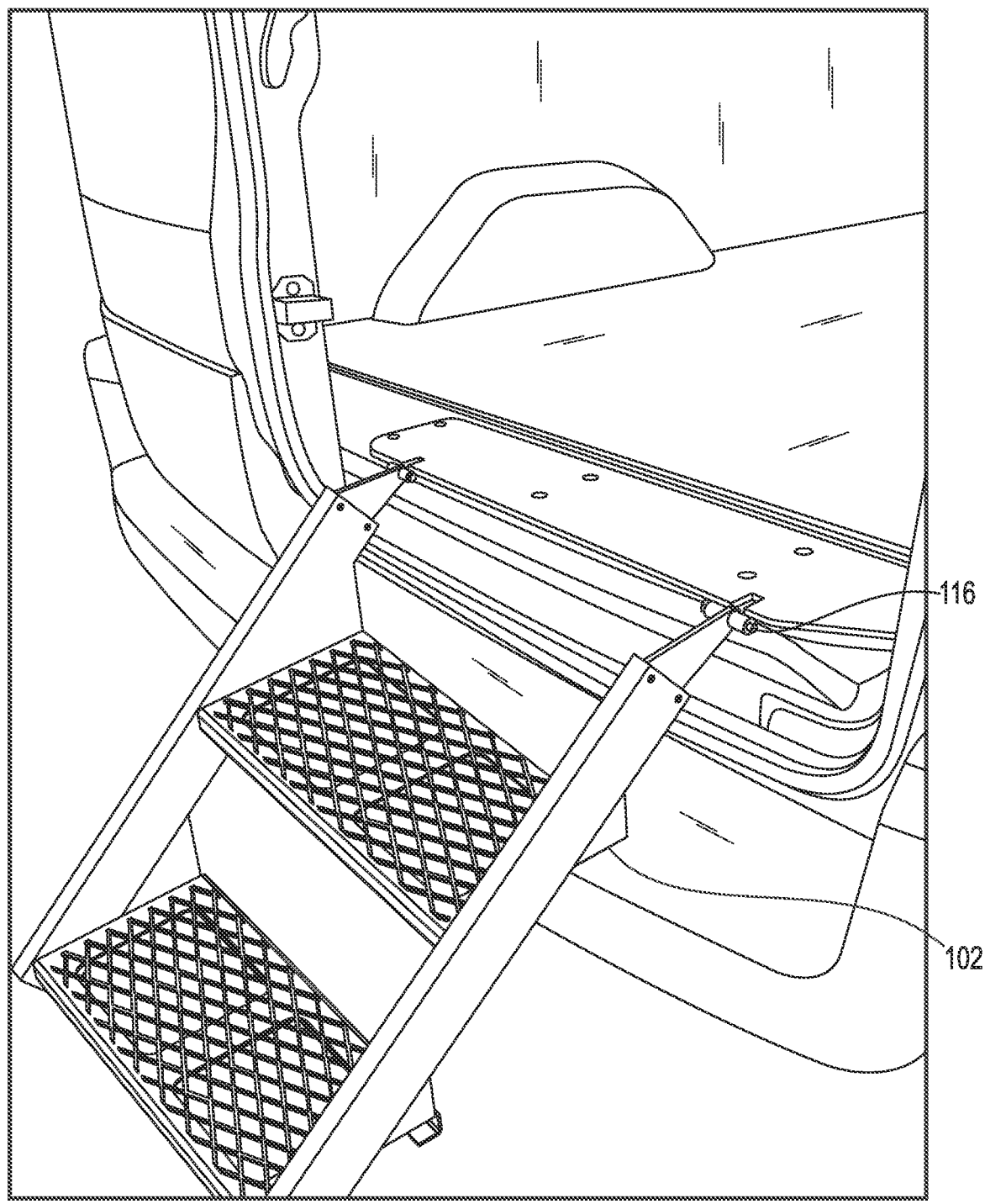
FIG. 6 is a perspective view of a van step assembly installed on a utility van in accordance with certain aspects of the invention.
Figure 7:
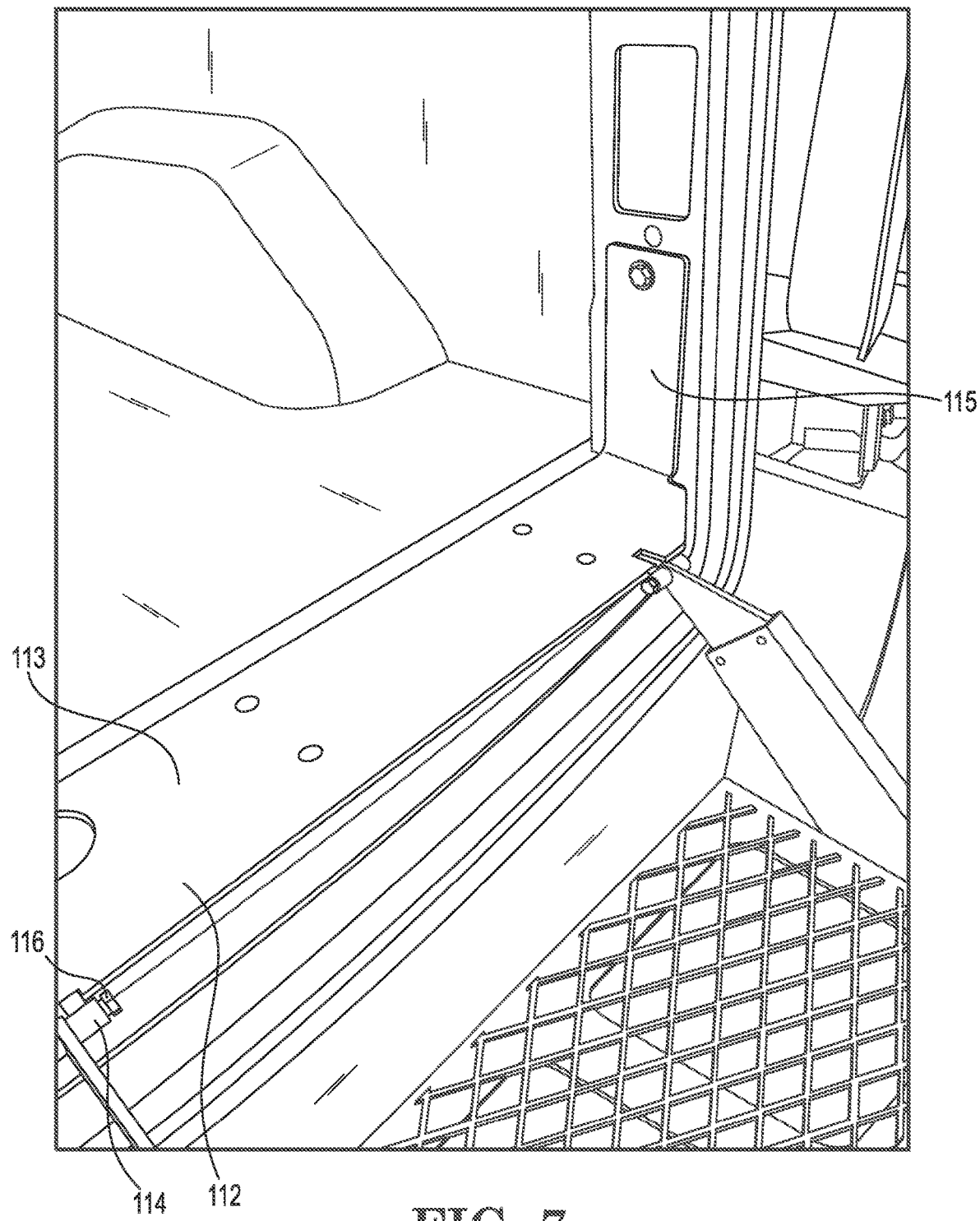
FIG. 7 is a perspective view of a van step assembly installed on a utility van in accordance with certain aspects of the invention.

Referring generally to FIGS. 1-3, stair assembly 100 comprises a top step 102 and a lower step 104, each spanning horizontally between a pair of side rails 106. A mounting flange 108 is disposed atop each side rail 108. The mounting flanges 108 can be separate brackets fastened or welded to the upper ends of the side rails 106, or they can be formed unitarily with the side rails 108. An aperture 110 is defined through the mounting flanges 108 adjacent to a vertically-highest end thereof to allow for a pin 116 (see FIG. 7) to be employed to pivotally mount the stair assembly 100 to a mounting plate 112 (see FIGS. 7 and 13-15) in a van as will be described further below.

The stair assembly 100 can also include more than one lower stair 104 in additional embodiments.

The top stair 102 and lower stair 104 can be textured as to enhance grip (reduce slippage) by shoes/boots of persons using the stair assembly 100. The stair surface itself can be formed of a metal lattice with a ribbed or saw tooth top edge. This arrangement will both provide grip and allow for any water, ice and snow to pass through the surface to prevent slippage. In certain alternatives, the top surface can be a planar metal plate or several elongated metal planks in a side-by-side arrangement to define a step surface. Drainage can occur through holes through the plate and via the gaps between adjacent planks.

Figure 13:
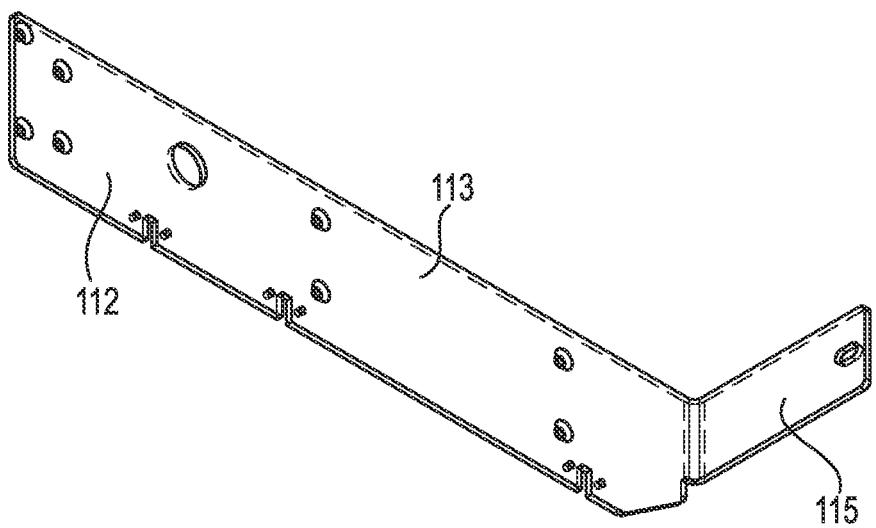
FIG. 13 is a perspective view of a mounting bracket for a van step assembly in accordance with certain aspects of the invention.
Figure 14:
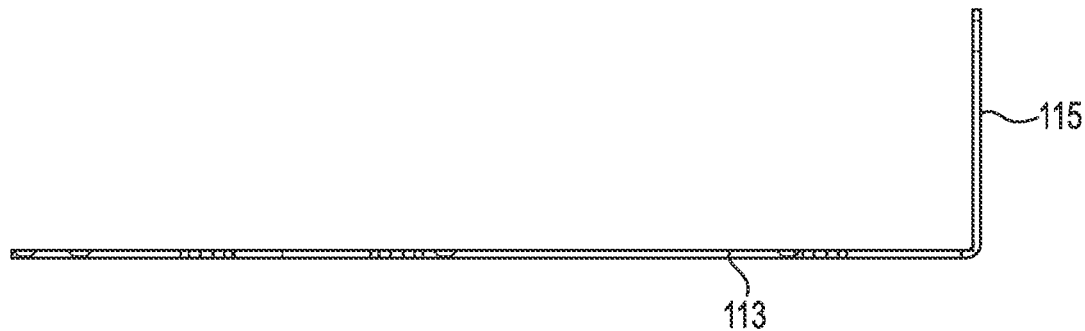
FIG. 14 is a side view of a mounting bracket for a van step assembly in accordance with certain aspects of the invention.
Figure 15:
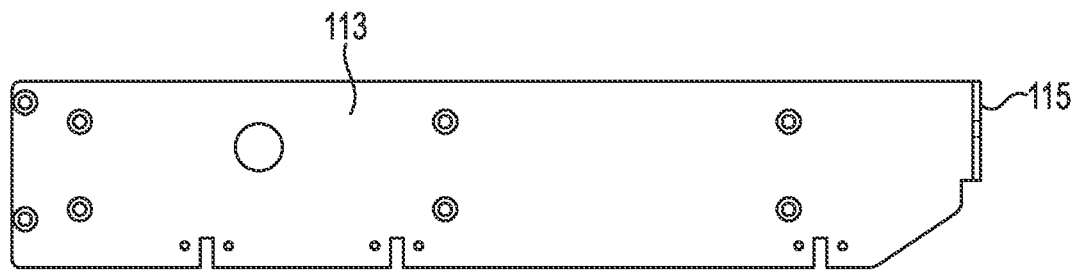
FIG. 15 is a top view of a mounting bracket for a van step assembly in accordance with certain aspects of the invention.

Referring now to FIGS. 13-15, the van mounting plate 112 is shown in several views. The mounting plate 112 comprises a flat base 113 that is fastened to the floor or base of a door frame of the van. A support flange 115 is defined on a longitudinal end of the flat base 113 and extends vertically upward so that the flange 115 can be fastened to the door frame or other vertical member of the van. Hinge tabs 114 can be located on an edge of the base 113 so that the mounting flanges 108 of the stairs can mate with the tabs 114 and then be pinned together with a removable pin 116 to allow for pivoting rotational movement of the stair assembly 100 about the axis of the longitudinal axis of the pin 116.

The various system components described herein can be formed of a variety of materials, such as metals (e.g. aluminum) and rigid composites, or a combination of materials, and the components thereof can be joined by conventional means (welding, mechanical fasteners and adhesives).

In one embodiment, the stair assembly 100 and mounting plate 112 are formed of aluminum. The mounting plate 112 can be fastened to the van via screws and/or bolts. The mounting flanges 108 can be bolted to an upper end of the side rails 106. The remaining components are welded together. Using bolts for the mounting flanges 108 allows the flanges to be changed so that the stairs 100 can be easily adapted to various van configurations.

Referring additionally to FIGS. 4-12, the stair assembly 100 is secured to a van. The stair assembly 100 can be used with either the rear doors or the side doors of the van.

Figure 16:
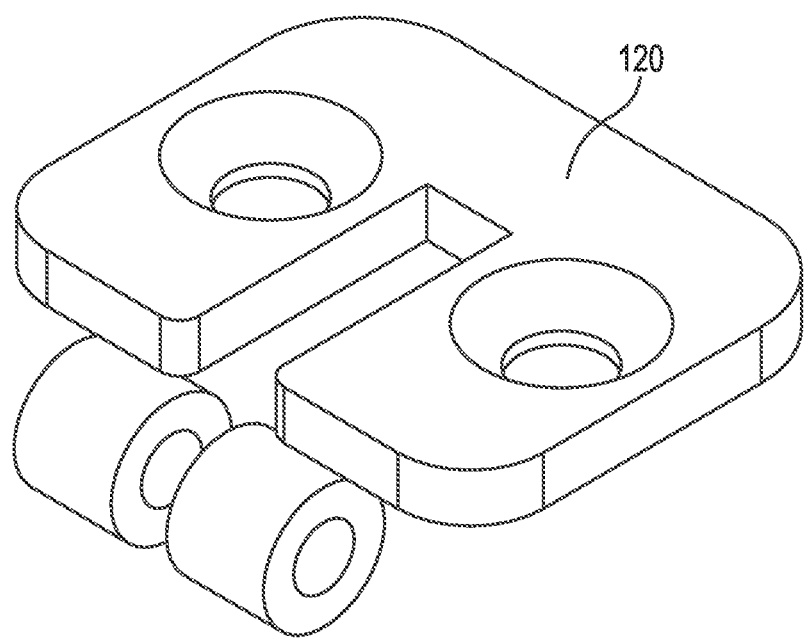
FIG. 16 is a perspective view of a hinge plate for a van step assembly in accordance with certain aspects of the invention.
Figure 17:
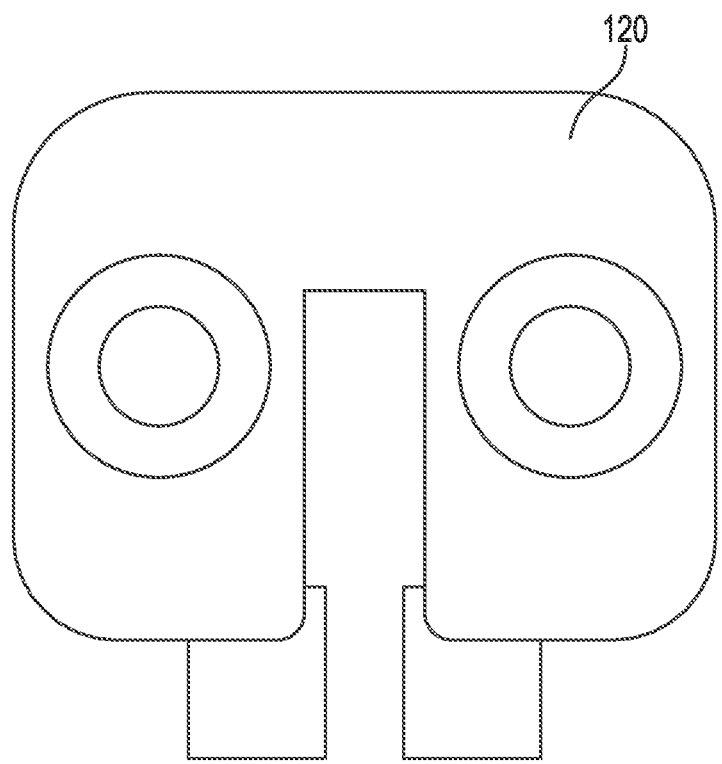
FIG. 17 is a side view of a hinge plate for a van step assembly in accordance with certain aspects of the invention.

The mounting plate 112 is fastened to the floor of the van adjacent to the location where the stairs will be attached. For example, the stairs assembly 100 is shown in FIGS. 4-12 to be mounted to the rear of the van on its passenger side (right side). The mounting flanges 108 are then pivotally secured to the mounting plate with pins 116. Note that the mounting tabs can be either unitarily formed as part of the mounting plates 112 or separate hinge plates 120 can be provided, such as shown in FIGS. 16-17, which are then fastened to the mounting plate 112. The pins can be bolts with nuts or they can be a quick release pin with a flanged longitudinal end and an opposing end with an aperture extending laterally therethrough to accept a retention clip.

Figure 10:
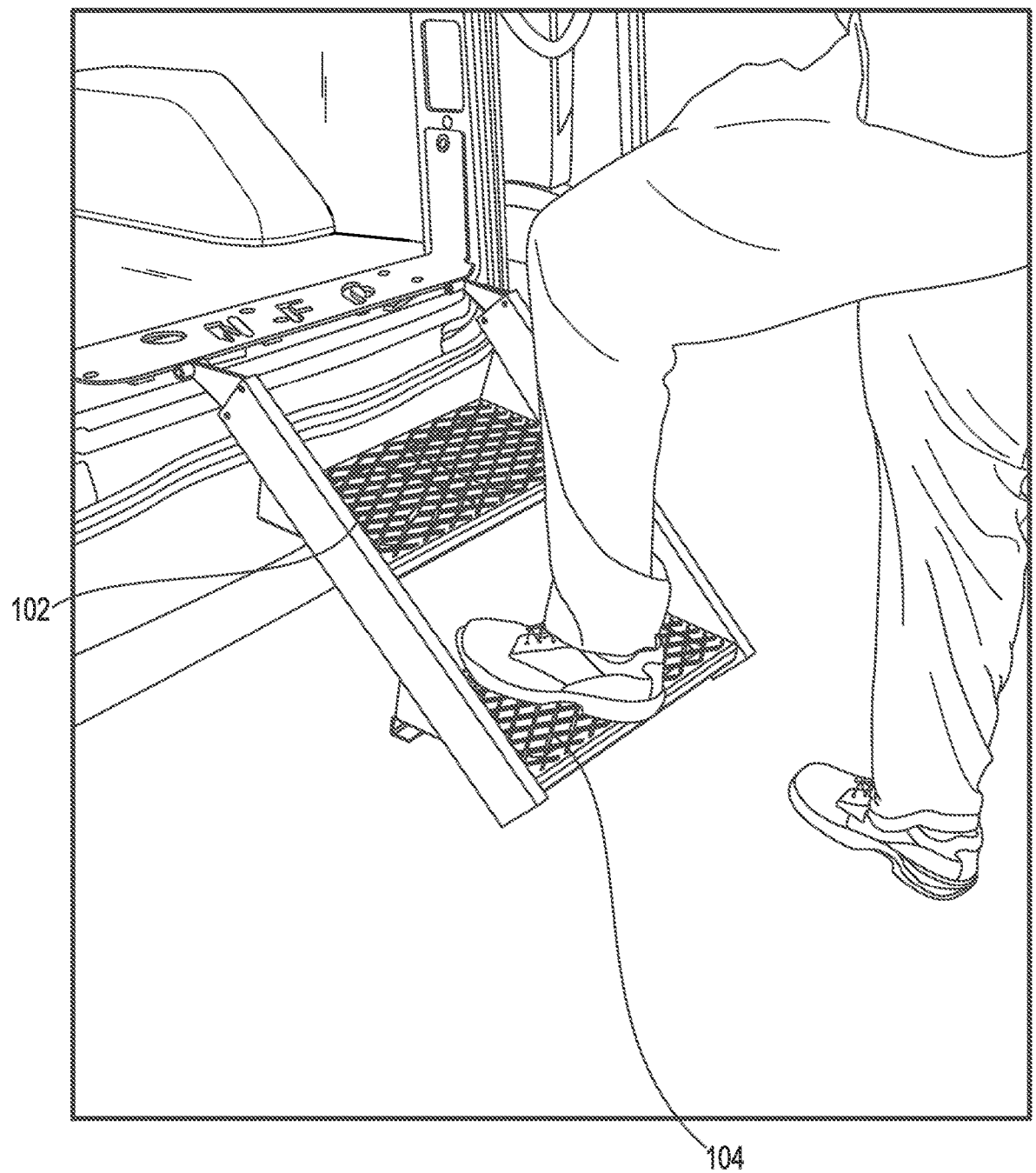
FIG. 10 is a perspective view of a van step assembly installed on a utility van in accordance with certain aspects of the invention.

In the deployed position, the stair assembly 100 is stabilized by at least a portion of the bottom surface of the top step 102 resting atop the top surface of the bumper of the van. This can be seem, for example, in FIGS. 4-7 and 9-10. The lower step 104 is spaced-apart from the upper stair 102 to present the user with a generally uniform height for each step. As shown in FIG. 10, the user first steps up from the ground to the lower step 104. The user then continues stepping upward until they enter the van. The process is reversed to exit the van. A grab handle can be added to the door frame or inside of the van to allow the user to stabilize themselves with a hand hold.

Figure 8:
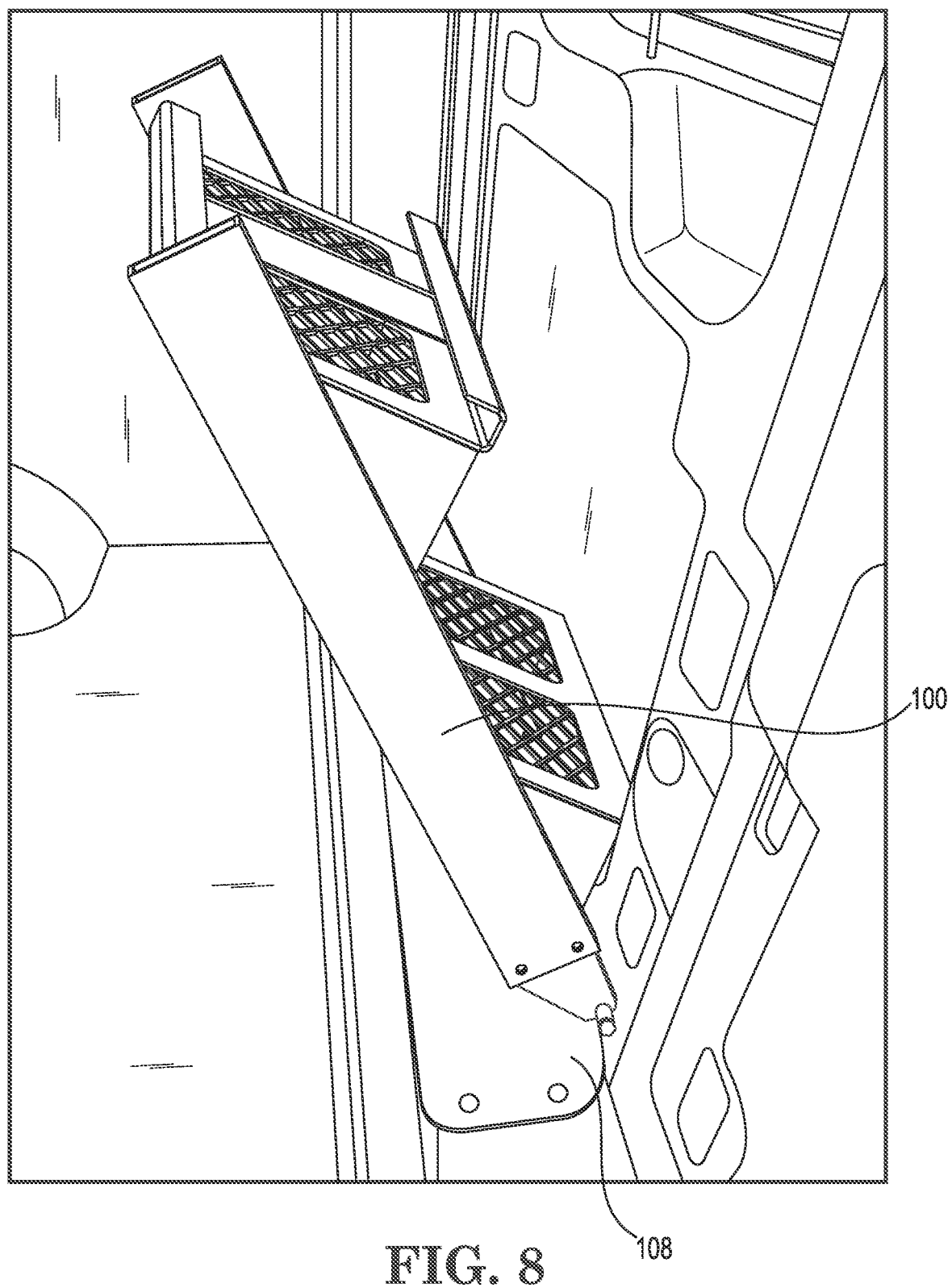
FIG. 8 is a perspective view of a van step assembly installed on a utility van in accordance with certain aspects of the invention.
Figure 9:
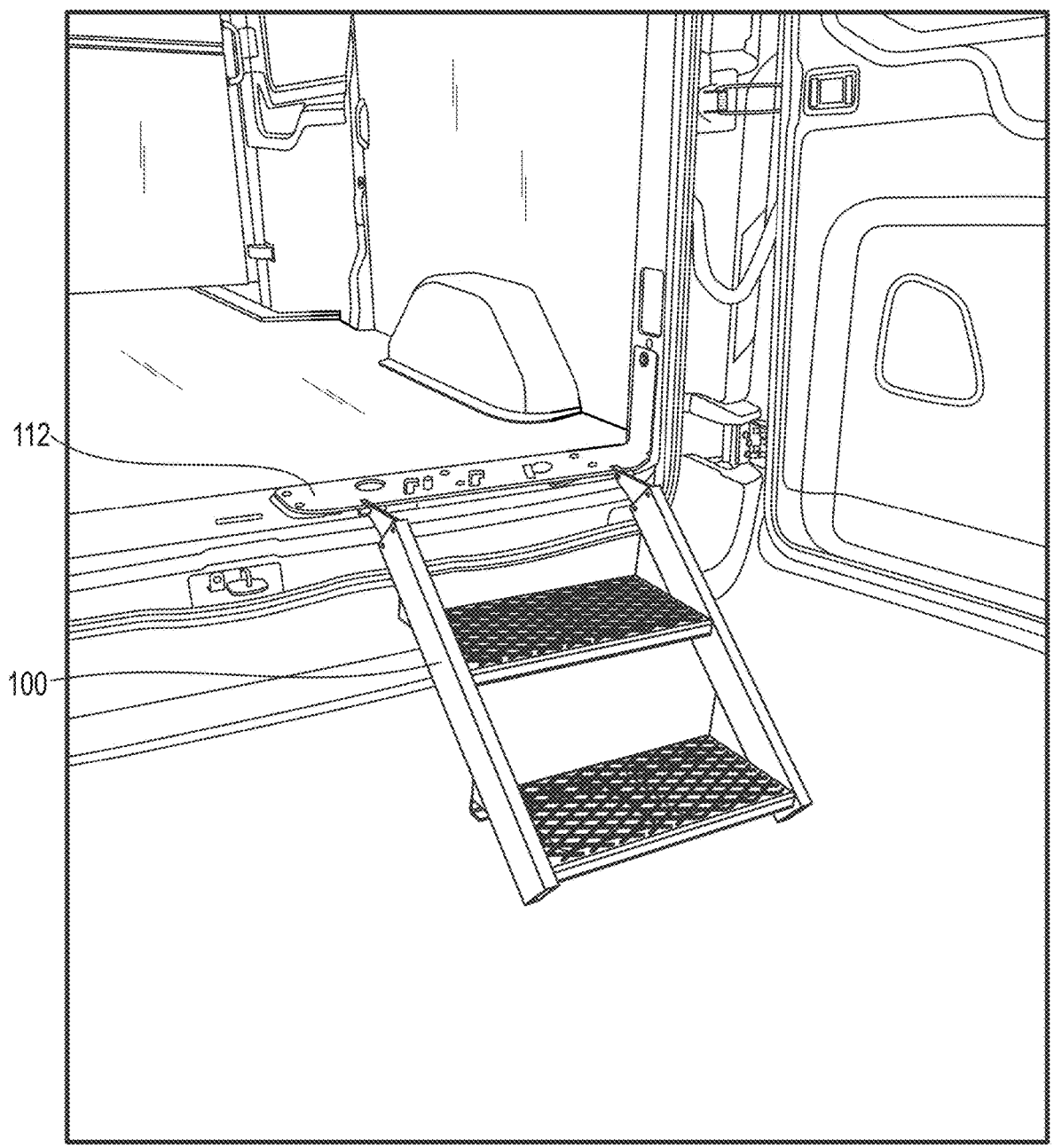
FIG. 9 is a perspective view of a van step assembly installed on a utility van in accordance with certain aspects of the invention.
Figure 11:
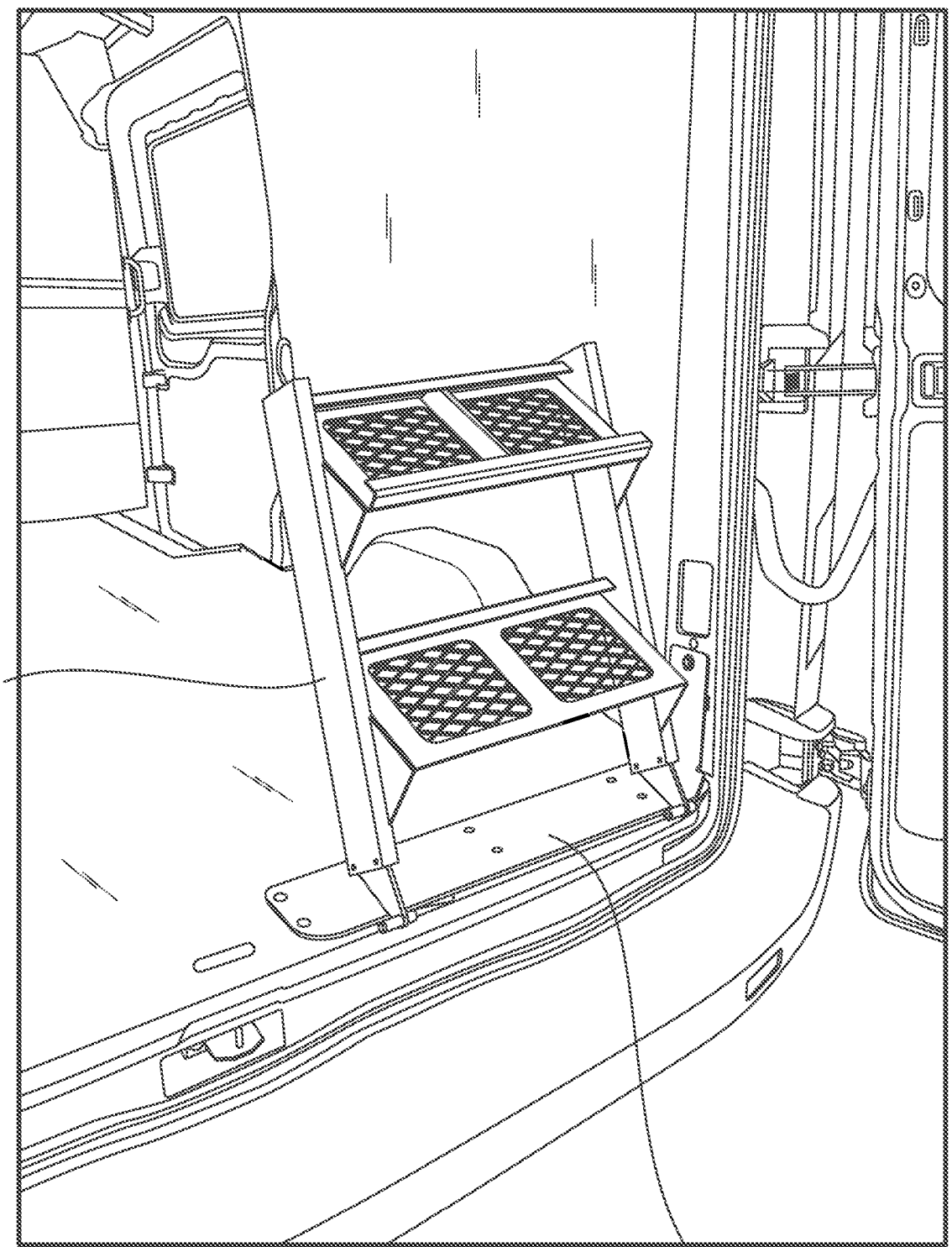
FIG. 11 is a perspective view of a van step assembly installed on a utility van in accordance with certain aspects of the invention.
Figure 12:
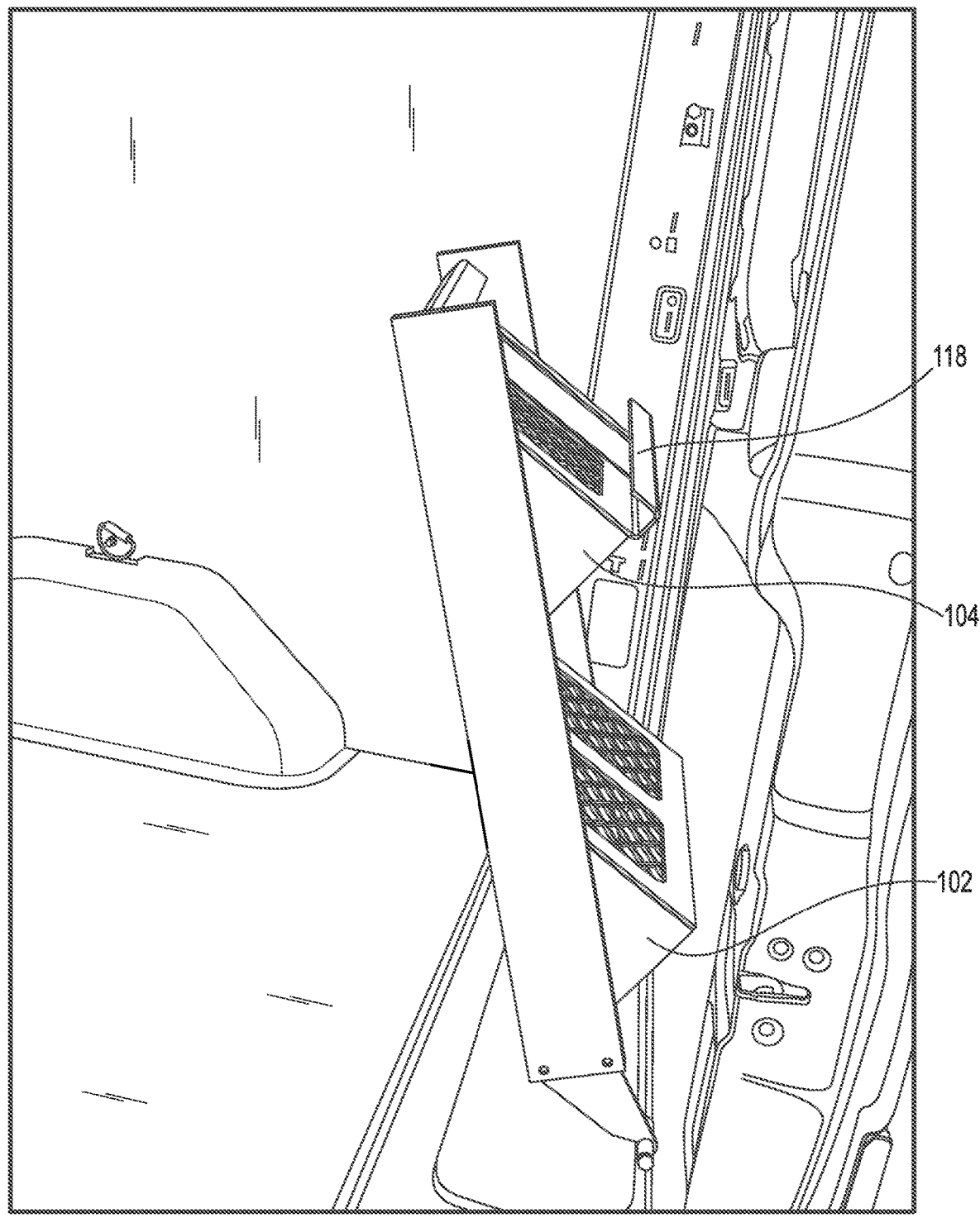
FIG. 12 is a perspective view of a van step assembly installed on a utility van in accordance with certain aspects of the invention.

The stair assembly 100 can be folded up when not in use as shown in FIGS. 8 and 11-12. The folding is accomplished by pivoting the stair assembly 100 about the hinge pins to rotate the stair assembly to an approximately inverted orientation. As can be seen in FIG. 12, the top edge of the mounting flanges 108 is angled such that the inverted position is maintained so that the stairs 100 consume minimal interior space. As shown in FIGS. 8 and 12, the stairs 100 pivot inward sufficiently, however, that the door of the van can be shut completely while the stairs are still attached. Thus, the stair assembly 100 is protected from the elements inside of the van and from theft, but can be easily and quickly deployed, and little interior space is consumed when the stair assembly 100 is in its inverted storage position inside of the van.

The angle of a top edge of the mounting flanges 108 defines a stop surface 122 to stop the stair assembly 100 from rotating further forward into the interior of the van. Thus, the stair assembly is prevented from substantial rotation when in the stored positon by the stop surface 122 in the forward direction, and by the van door in the rearward direction.

If desired, the stair assembly 100 can be quickly and easily removed by the user removing the pins 116 and lifting the stair assembly 100 away. Re-attaching the stair assembly 100 is just as easy to perform in the reverse order. The mounting plate 112 can remain in place because it has virtually no effect on the usage of the van when the stair assembly 100 is not attached.

The rigidity of the steps 102, 104 can be enhanced by providing reinforcement members 118 below each step. The reinforcement member 118 can be a c-channel or I-channel or other structural beam member that spans a forward to rearward width of the stair for example. The beams can also run side-to-side, or a perimeter can be formed. The reinforcement member can be the structure of the stair assembly that contacts the top of the van's bumper While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A stair assembly for a utility van, comprising:
   a pair of side rails oriented parallel to one another, each side rail having a first longitudinal end and a second longitudinal end;
   a first step spanning between the pair of side rails;
   a second step spanning between the pair of side rails, the second step arranged between the first step and the second longitudinal ends of the pair of side rails
   a pair of mounting flanges, wherein each mounting flange extends from the first longitudinal end of a respective one of the pair of side rails, each mounting flange defining an aperture through the flange in a direction perpendicular to a longitudinal axis of the pair of side rails; and
   a mounting plate, the mounting plate including a flat base portion and a support flange, the support flange extending perpendicular from the flat base portion at a longitudinal end of the flat base portion,
   wherein the mounting plate includes a pair of hinge tabs, each hinge tab configured to receive a portion of a respective one of the support flanges such that the aperture in each of the mounting flanges aligns axially with each respective hinge tab, and
   wherein the first step is located relative to the first end of the pair of side rails such that a bottom of the first step can rest atop a bumper surface of the utility van when the stair assembly is in a deployed state.

2. The stair assembly of claim 1, further comprising a pair of pins, each insertable through a respective one of the hinge tabs and apertures of the support flanges such that the pair of side rails are constrained to rotatably pivot about a longitudinal axis of the pins.

3. The stair assembly of claim 2, wherein each mounting flange defines a pivot stop surface along an edge thereof.

4. The stair assembly of claim 1, wherein each mounting flange defines a pivot stop surface along an edge thereof.

5. The stair assembly of claim 1, wherein each of the hinge tabs is removably fastened to the flat base portion.

6. The stair assembly of claim 1, wherein each of the first and second steps defines a textured upper surface.

7. The stair assembly of claim 6, wherein the textured upper surface comprises a metal lattice.

8. The stair assembly of claim 1, wherein each of the mounting flanges is fastened to a respective one of the pair of side rails.

9. The stair assembly of claim 1, wherein the mounting flanges are removably fastened to a respective one of the pair of side rails with bolts.

10. The stair assembly of claim 1, further comprising a mounting plate configured such that the pair of mounting flanges can be pivotably secured to the mounting plate without blocking normal closing of any doors of the utility van.

11. The stair assembly of claim 1, further comprising a reinforcement member provided to at least one of the first and second steps.

12. A method of providing stairs to a utility van, the method comprising:
fastening a mounting plate to the utility van adjacent to a door thereof;
pivotably coupling a stair assembly to the mounting plate;
pivoting the stair assembly into a deployed position where a bottom of the uppermost step rests atop a bumper of the utility van;
pivoting the stair assembly into a retracted position; and
closing the door of the utility van adjacent to the stair assembly fully while the stair assembly is in the retracted position without uncoupling the stair assembly from the mounting plate.

13. The method of claim 12, wherein the step of pivotably coupling a stair assembly to the mounting plate comprises pinning a mounting flange of the stair assembly to the mounting plate.

14. The method of claim 12, wherein the step of pivotably coupling a stair assembly to the mounting plate comprises pinning a mounting flange of the stair assembly to a hinge plate provided to the mounting plate.

15. The method of claim 12, wherein the step of fastening a mounting plate to the utility van adjacent to a door thereof comprises fastening a flat base portion of the mounting plate to a horizontal surface of the utility van and fastening a support flange extending perpendicular from the flat base portion at a longitudinal end of the flat base portion to a vertical surface of the utility van.

16. The method of claim 12, further comprising fastening a mounting flange to a first end of each of a pair of side rails of the stair assembly.

17. A stair system for utility vans, comprising:
a stair assembly, comprising:
a pair of side rails oriented parallel to one another, each side rail having a first longitudinal end and a second longitudinal end;
a first step spanning between the pair of side rails;
a second step spanning between the pair of side rails, the second step arranged between the first step and the second longitudinal ends of the pair of side rails;
a pair of mounting flanges, wherein one of the mounting flanges extends from the first longitudinal end of each one of the pair of side rails; and
a mounting plate, the mounting plate including a flat base portion and a support flange, the support flange extending perpendicular from the flat base portion at a longitudinal end of the flat base portion,
wherein the mounting plate includes a pair of hinge tabs, each hinge tab configured to receive a portion of a respective one of the support flanges such that the aperture in each of the mounting flanges aligns axially with each respective hinge tab, and
wherein each of the mounting flanges is pivotally coupled to the mounting plate such that the stair assembly can rotatably pivot between a deployed state and a retracted state.

18. The stair system for utility vans of claim 17, wherein the first step is located relative to the first end of the pair of side rails such that a bottom of the first step can rest atop a bumper surface of the utility van when the stair assembly is in the deployed state.

\* \* \* \* \*